Nov. 10, 1942.  L. H. KIRK ET AL  2,301,287
OPHTHALMIC MOUNTING
Filed July 31, 1939  2 Sheets-Sheet 1
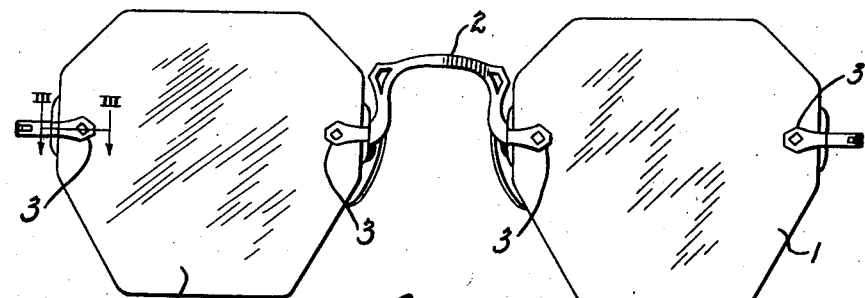
Fig. I
Fig. II
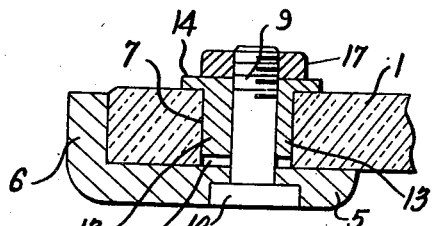
Fig. III
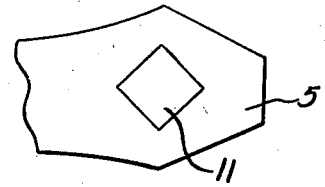
Fig. IV
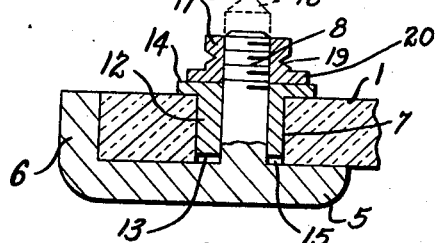
Fig. V
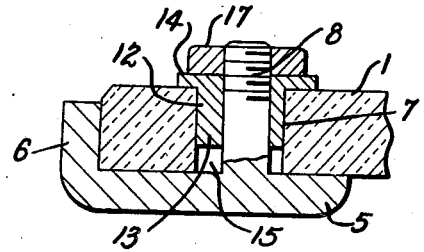
Fig. VI
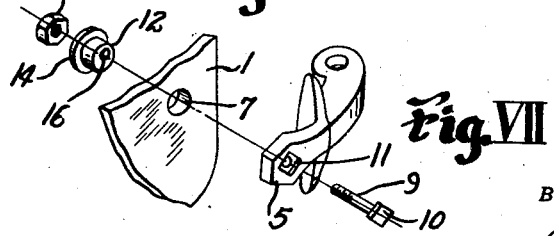
Fig. VII
INVENTOR.
LLOYD H. KIRK
BROR J. JACOBSON
BY Harry H. Styll.
ATTORNEY.

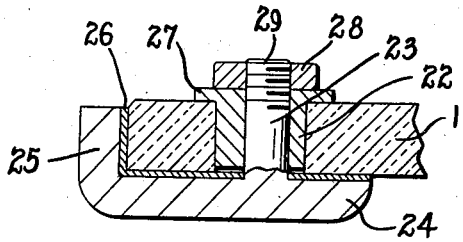
Fig. VIII
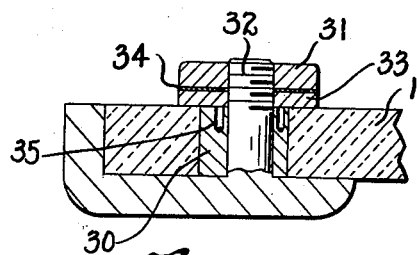
Fig. IX
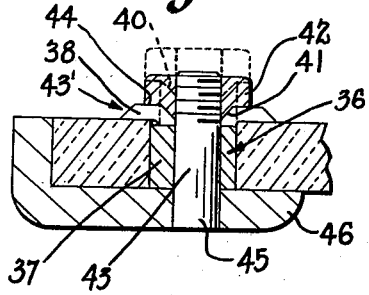
Fig. X
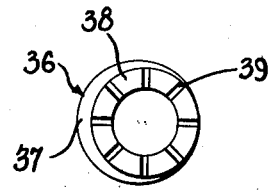
Fig. XI
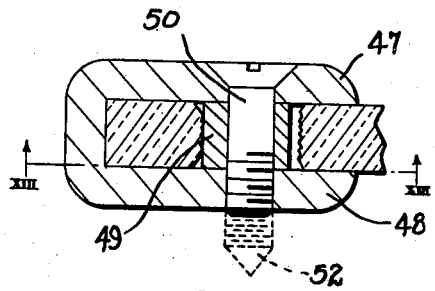
Fig. XII
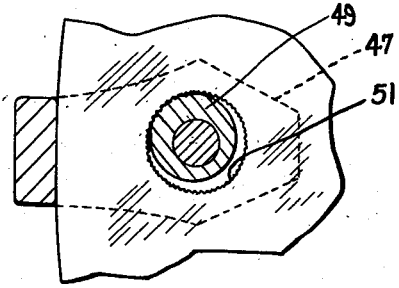
Fig. XIII
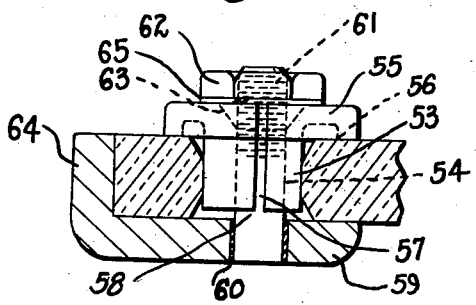
Fig. XIV
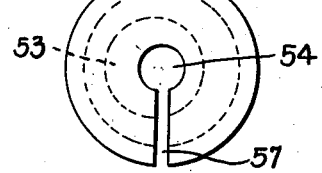
Fig. XV
INVENTOR.
LLOYD H. KIRK
BROR J. JACOBSON
BY Harry H. Styll
ATTORNEY Patented Nov. 10, 1942

2,301,287

UNITED STATES PATENT OFFICE 2,301,287

OPHTHALMIC MOUNTING

Lloyd H. Kirk, Cranston, and Bror J. Jacobson, Gaspee Plateau, R. I., assignors to Martin-Copeland Company, Providence, R. I., a voluntary association of Rhode Island Application July 31, 1939, Serial No. 287,524

2 Claims. (Cl. 88—47)

This invention relates to improvements in ophthalmic mountings.

This application is a continuation in part of our application Serial Number 233,614, filed October 6, 1938, and patented September 5, 1939, as Patent Number 2,171,753, all applicable parts whereof are hereby made a part hereof.

One of the principal objects of the invention is the provision of new and improved means whereby replacements or repairs using thicker lenses may be made without discarding the original lens strap connection.

Another object of the invention is to provide a new and improved means for assembling repairs or replacements using thicker lenses without discarding the original strap connection.

Another object of the invention is to provide new and improved lens connections for an ophthalmic mounting whereby repairs and replacements utilizing thicker lenses than in the original mounting may be made with the original lens strap connections.

Another object of the invention is to provide new and improved means for assembling the lens connections of an ophthalmic mounting of the characters described whereby loss of original parts may be avoided in repairs and replacements thereby constituting a great economy and saving in money, and expediting the service in the saving of time for the patient or user in the making of repairs and replacements, and also providing a great saving to the dispenser in the reduction of investment in stocking the parts for repairs and replacements.

Another object of the invention is to obtain all the advantages and objects of the invention of our earlier application aforesaid and in addition thereto the improvements and advantages herein specified.

Another object is to provide a novel arrangement of taking up the looseness and play of a lens strap on a lens and cushioning the lens against strain when the parts are in assembled relation with each other.

Another object is to provide connecting means formed of pliable material for taking up the looseness and play of a lens strap on a lens which may be molded to the surface with which it engages and will assume a cushioning interlocking engagement therewith to relieve strain between the lens strap and the lens.

Other objects and advantages of the inventions will become apparent from the following description taken in connection with the accompanying drawings. It is apparent that various changes may be made in the details of construction and arrangement of parts without departing from the invention as expressed in the accompanying claims.

The invention therefore should not be limited to the exact matters shown and described as the preferred forms have been shown and described by way of illustration only.

Referring to the drawings:

Fig. I is a front view of an ophthalmic mounting embodying the invention;

Fig. II is a top view of Fig. I;

Fig. III is a cross section on line III—III of Fig. I;

Fig. IV is a partial front view of Fig. III;

Fig. V is a partial cross section similar to Fig. III, showing a modified form with a long retaining nut;

Fig. VI is a partial cross section similar to Fig. V, showing a thin retaining nut;

Fig. VII is a partial perspective showing one form of the invention with the parts unassembled and in line for assembly.

Figs. VIII, IX and X are views generally similar to Fig. VI of modified forms of the invention;

Fig. XI is a plan view of the bushing used in the arrangement shown in Fig. X;

Fig. XII is a sectional view similar to those illustrated in Figs. VIII to X inclusive illustrating a further modification of the invention;

Fig. XIII is a sectional view taken as on line XIII—XIII of Fig. XII and looking in the direction indicated by the arrows.

Fig. XIV is a partial sectional view of a further modification of the invention;

Fig. XV is a plan view of the bushing of the construction, illustrated in Fig. XIV.

One of the difficulties which has been found from experience with a lens connection wherein the stem that extends through the lens opening is integral with the lens strap is that after the mounting has been initially assembled with the parts in place, the end of the stem projecting beyond the nut is cut off. If a lens is broken, and the replacing lens is thicker than the original lens it is clear that there will not be sufficient screw threads on the outer end of the stem left to provide a secure connection. In such a case the whole lens strap would have to be thrown away or scrapped and a new strap provided. These straps are expensive so such a proceeding is expensive. Also the dispenser would have to order new straps from the factory. This would take considerable time, and the patient or user would have to wait several days for his repairs. This is a defect from the standpoint of service. It is a principal object of the invention therefore to provide means and processes by which these disadvantages are overcome in a simple, efficient, and economical manner, by improvements which enhance the value of the construction considerably in the art.

Referring to the drawings in which similar reference characters designate similar parts throughout:

The invention is applied to an ophthalmic mounting comprising a pair of lenses 1, held in aligned spaced position by a bridge member 2. The bridge ends are attached to the lenses by the lens straps 3. In spectacles where temples 4 are employed the temple connections are also secured to the lenses by the straps 3.

The lens straps 3 comprise an ear 5 contacting the face of the lens and an edge section 6 engaging the edge of the lens. The lenses have the openings 7 therethrough in required positions. In Figs. V and VI the stem 8 extending through the opening 7 in the lens is integral with the strap ear 5. In Fig. III the stem 9 is not integral but has a head portion 10 of a polygonal shape having side edge portions. The strap ear has a corresponding recess 11 into which the head 10 fits, being held against rotation by the side edge portions of the head. The head 10 may be of any shape having engaging side edges, or any desired means of interengaging the stem 9 and the strap 5 to prevent rotation, but to allow longitudinal movement of the stem through the strap opening may be used, so long as the stem is non-rotatably held in relation to the strap ear. The end of the stem 9 opposite the head end is preferably screw threaded.

The lens is perforated to allow admission of the stem 9. Fitting in the opening in the lens and interengaging the stem 9 on the side opposite the head thereof is the bushing 12. This bushing has the stem portion 13 extending into the lens opening and non-threadedly engaging the stem 9, an dthe shoulder portion 14 engaging the face of the lens and overlying the end of the opening therein. The stem of the bushing is shorter than the length of the opening in the lens to leave a space 15 when the parts are assembled.

The bushing 12 has the opening 16 into which the stem 9 is fitted. This opening 16 is eccentric to the center of the bushing stem, allowing the bushing to be fitted loosely into the opening in the lens and then rotated to tighten the edge of the lens against the edge portions 6 of the strap.

When the parts are assembled in position the nut 17 is screwed down on the stem 9 until the nut engages the shoulder 14 of the bushing, locking the parts together in assembled positions.

It is clear that this construction adapts itself to lenses of various thicknesses, a thin lens being shown in Fig. V, and a thicker lens in Fig. VI.

The bushing is preferably made of a semi-resilient or yieldable material such as synthetic plastics, fibre, rubber and similar products.

In cases where the stem 8, Figs. V and VI, is integral with the lens strap ear the projecting end 18 of the stem is cut off when the parts have been assembled. If a lens is broken and has to be replaced and a thicker lens is used than was used in the initial assembly it is clear that the stem will be too short for the nut to secure a sufficient hold and the repair cannot be made without substituting a new complete strap; also if the threads on the stem become stripped in use, a repair cannot be made without substituting a complete new strap connection.

If a stem 9, Fig. III, which is not integral, but is held against rotation by the facet head or other device is used, the repair can be readily made simply by substituting a new stem. These stems may be carried in stock the same as present day lens screws are stocked by the dispensers.

If an integral stem is used as shown in Figs. V and VI the repair may be made where a thicker lens is inserted, as follows. The parts are initially assembled as shown in Fig. V where a thin lens 1 is used, and a long nut 17a is employed on the end of the stem, then if a repair of replacement is made using a thicker lens as shown in Fig. VI, a thinner nut 17 of sufficient thread area may be substituted for the longer nut of Fig. V. The provision for this is made by using a longer nut than is required in the initial assembly. This repair may be made by carrying in stock a supply of the thinner nuts.

The same result may be obtained in the assembly shown in Figs. V and VI by providing a cutting groove 19 in the nut 17a of Fig. V. When the thicker lens of Fig. VI is inserted the nut 17 may be cut off by a cutting appliance at the groove 19 and cut and finished off smooth. With this procedure no additional nuts need be carried in stock.

The assembling operations are as follows: The lenses are drilled with the lens holes spaced from the edge of the lens so as to give some play between the edge of the lens and the portions 6 of the lens strap. There is here more leeway in drilling the lens holes than in the old screw style of connections. This is a big advantage in the case of assembling. The stem 9 is inserted in the lens holes, and the bushing 12 inserted on the stem so as to be in loose position in the lens hole. The eccentric bushing 12 is then rotated to tighten the edge of the lens against the edge 6 of the strap, the nut 17 is then screwed down on the stem to engage the bushing and lock the parts together.

Replacements with thicker lenses may be made as has been described above by using either a longitudinally slidable stem with a facet head or by setting up initially with a nut longer than normally necessary and thereafter using a thinner nut which may be a separate nut, or obtained by cutting off the original nut.

In eyeglasses only two of these connections are necessary. They are located on the nasal sides of the lenses. In spectacles four connections are used, as spectacles must also have temple connections on the temporal sides of the lenses in addition.

The variation in thickness of lenses would probably in the majority of cases be not much over one millimeter. There is a variation in the thicknesses of lenses for the same power and this invention will provide for such variation when replacements are made.

In instances when a stem 9 having a facet head is used, the shouldered recess 11, in the portion of the lens strap 5 overlying a face of the lens, and said facet head may be so dimensioned that the head 10 will have a frictional fit with the walls of the depression 11 so that the stem 9, when the parts are in assembled relation with each other, will be held relatively rigid so that all the looseness and play of the lens strap on the lens may be taken up by rotation of the bushing 12. With this arrangement, the stem will function similar to an integral stem, such as shown in Fig. V, and will eliminate any side play of the stem when the the parts are being tightened. This is to avoid introduction of strain on the lens when the nut 17 is tightened. The main requirement, however, of the stud 9 is that it be held against rotation so as to avoid having the nut become loose by the working of the lens strap on the lens during use. It is to be noted that if the stem is held against rotation no ratchet action will be directed to the nut 17 to cause it to loosen.

It is also to be noted that the stem 9, instead of being formed with a facet head 10, may be fitted in an opening formed in the portion 5 of the lens strap which is to overlie a face of the lens and could thereafter be staked therein to hold said stem against rotation thus causing it to function as an integral part of the strap. The stem could, if desired, be solder connected to the strap either with a portion internally of an opening in the strap ear or butt soldered or welded to the inner face of said strap ear.

The nut 17a, as shown in Fig. V, may have its main body portion formed relatively narrow and may be formed with a flanged portion 20 providing a wide surface contact with the shouldered portion 14 of the bushing 12.

In the construction, illustrated in Fig. VIII, a bushing 22 generally similar to the bushing 12 illustrated in Fig. III is used. In this instance, however, the bushing is formed of a relatively rigid material, such as metal, brittle Bakelite or other similar materials, which have a non-yielding characteristic. The bushing 22 has a body portion formed with an eccentric bore adapted to fit into a stud 23. The stud 23 is illustrated as being formed integral with the strap ear 24 overlying a side surface of the lens 1. It is to be undertsood, however, that it may be formed separately of said strap ear in a manner similar to that illustrated in Fig. III in which instance it is provided with a head having an irregular contour fitting within a recess of a similar contour formed in the strap ear. The lens strap in this instance has a portion 25 overlying the edge surface of the lens. The said portion 25 and strap ear 24 are provided with a liner member 26 of resinous or cellulose material which has a pliable resilient nature adapted to ease off the strain of the strap connection to the lens and provide cushioning means for the lens. The bushing 22, like the bushing 12 of Fig. III, is provided with a flanged head 27 adapted to overlie the adjacent side surface of the lens. A nut 28 threadedly connected at 29 to the stud 23 is adapted to retain the bushing and strap in adjusted relation with the lens. It is to be understood that the liner may extend only throughout the portion 24 overlying the side surfaces of the lens. It is also to be understood that in instances wherein there is no liner between the portion 24 and lens a similar liner may be provided beneath the flanged head 27, that is, between said flanged head 27 and the adjacent surface of the lens.

The purpose of the liner member is to provide means whereby the lens strap will be cushioned from the lens, that is, whereby any strain which might be introduced through the rotation of the bushing 22 in taking up looseness in play in the lens strap on the lens may be relieved through the pliable and resilient nature of the liner 26. The assembly otherwise functions generally similar to the assembly shown in the previous views in compensating for any looseness of fit that the strap might initially have with the lens through rotation of the bushing to move the thicker wall thereof into engagement with the side wall of the opening in which the body portion of the bushing 22 is fitted. Rotation of the bushing 22 causes the edge portion 25 to move firmly into engagement with the adjacent edge surface of the lens and tightening of the nut 28 causes the portion 24 engaging the side surface of the lens to firmly engage said side surface and simultaneously holds the bushing 22 against rotation through the clamping of the flanged head 27 between the nut 28 and the adjacent side surface of the lens.

It is to be understood that although the bushing 22 is described as being preferably formed of a rigid non-pliable or resilient material the said bushing may be formed of a pliable or resinous or cellulose material if desired or any other suitable material having similar characteristics.

In Fig. IX there is illustrated a further modification in which the eccentric bushing 30 lies substantially entirely within the opening in the lens. In this instance, the bushing 30 may be formed of any desirable material preferably of a pliable resilient material having the characteristics of resinous or cellulose materials which are in themselves moldable within certain limits. The nut 31 which is threadedly connected to the stud 32 to retain the lens 1 in assembled relation with the strap is, in this instance, provided with a layer 33 of material similar to that used in forming the bushing 30. This layer may be in the form of a separate washer or may be attached to the nut as by a suitable coating of adhesive or the like 34. To rotate the bushing 30 to take up the looseness and play of the lens strap on the lens, said bushing is provided with spaced openings 35 in which the ends of a suitable spanner wrench may be placed to rotate the bushing on the stud 32 prior to placing the nut on said stud. It is to be understood that the portion of the lens strap overlying the edge of the lens and the portion overlying the face of the lens may or may not be provided with a resilient lining, such as shown at 26 in Fig. VIII.

In Fig. X there is illustrated a further modification. In this instance, a sleeve-like bushing 36 is used. This bushing has a body portion 37 provided with an eccentric bore and has a concentric extension 38 provided with a plurality of radially extending slots 39. The concentric portion, as illustrated by dotted lines at 40, is provided with an inwardly tapering upper edge. This edge is adapted to be engaged by a tapered surface 41 formed on the clamp nut 42. In use, the bushing 36 is fitted on the stud 43 internally of the opening in the lens. It may then be rotated to take up the looseness and play on the lens or the nut 42 may be threaded downwardly of said stud so as to cause the concentrically extending slotted portions 38 to be wedged outwardly by said tapered surface 41 and the adjacent under surface of the nut, illustrated at 43'. It is to be particularly noted that the nut has an under surface 44 substantially parallel with the adjacent side surface of the lens so as to provide a frictional contact with the outwardly flared portions 38 when the nut is tightened into holding position. These outwardly flared portions, therefore, form friction binding means through frictional contact with the adjacent surface of the lens and the under surface 44 of the nut to hold the bushing against displacement during use of the device and also frictionally locks the nut against loosening while relieving strain on the lens. The surfaces of the tapered protrusion 41 functioning in cooperative relation with the under surface 44 of the nut provide increased frictional contact with the adjacent end of the bushing tending to more positively maintain the nut against backing out and becoming lose during the use of the device. The tapered protrusion 41 also increases the thread bearing connection with the stud 43.

It is to be understood that similar protrusions may be provided on all of the above mentioned nuts.

It is also to be noted that the stud 43 has an end 45 located within an opening in the portion 46 of the lens strap overlying the side surface of the lens. The end 45 may be anchored to said portion 46 by staking or by soldering or welding. The arrangement is such, however, that if the thread bearing of the stud 43 becomes stripped or worn the said stud may be replaced without having to discard the entire lens strap assembly. It is to be understood that a stud, such as shown in Fig. III might be used if desired. This is true of all the arrangements illustrated in the various figures, that is, the various studs may be integrally connected with the strap or may be attached to said strap by staking, soldering or welding, as illustrated in Fig. X, or may be provided with an enlarged head with an irregular contour, such as illustrated in Fig. III, with said stud functioning so as to hold the said head against rotation and, if desired, may be frictionally forced into the recess in the strap to hold the stud in position.

In Figs. XII and XIII there is illustrated a further modification of the invention. In this instance, however, the strap is provided with spaced perforated ears 47 and 48. An eccentric bushing 49 of any desired material, preferably of a plastic material such as set forth above, is positioned within an opening formed in the lens. The strap is then placed on the lens with the openings in the ears 47 and 48 substantially aligned with the eccentric bore of the bushing 49. A suitable tool, such as a rat tail file or reamer or a special tool may be designed which may be inserted inwardly of the bore of the bushing 49 so as to engage therewith whereby the bushing may be rotated so that the eccentric portion thereof will take up the looseness and play between the lens strap and lens should such looseness exist. When rotated to a position whereby it will take up such looseness and play the rat tail file or reamer or special tool is then removed and a screw 50 is inserted in said aligned openings and is threadedly connected with a threaded bore provided in one of the openings of the strap ears. The bushing 49 may be formed to a length slightly greater than the width of the immediate lens used so that when the strap ears 47 and 48 are drawn into engagement with the lens they will frictionally engage the opposed ends of the bushing 49 and frictionally retain it in adjusted position. It is to be understood, however, that due to the nature of the material used in forming the lens, particularly glass, the side walls of the opening in said lens, as illustrated at 51 in Fig. XIII, will inherently have irregularities, that is, will have a plurality of minute irregular protrusions. When the bushing 49 of plastic resilient material is rotated, so as to move the strap into binding relation with the lens the said bushing will become interlocked with the irregularities 51 through the self molding characteristics of the material of said bushing to the side walls of the opening in the lens. These irregularities thereby tend to retain the bushing 49 in adjusted position. In view of the latter function the said bushing 49, if desired, may be initially of a length less than the width of the lens with the interlocking relation of the bushing and the irregularities of the side walls of the opening in the lens functioning as the sole means for retaining the bushing in adjusted position. If desired, instead of using a separate tool for rotating the bushing the bore of the bushing may be formed to a diameter less than the diameter of the screw 50. The screw, in this particular instance, would preferably be provided with a pointed end 52 which, after the parts have been assembled, would permit the screw to be forced inwardly of the eccentric bore of the bushing 49. In this instance, the act of threading the screw inwardly of the bushing and inwardly of the opposed strap ear would automatically cause the bushing 49 to rotate internally of the opening in the lens an amount permitted only by the engagement of the bushing with the wall of the opening in the lens after the strap has been moved into intimate relation with the edge of the lens. This function would cause the bushing to firmly become interlocked with the irregularities of the surface internally of the opening in the lens and would be held by said irregularities against further rotation when the edge engaging portion of the strap is in intimate fit with the adjacent portion of the lens. The screw would thereafter be threaded with the edge of the portion and the opposed strap ear to hold the parts in rigid relation with each other. It is to be understood that, if desired, the ears 47 and 48 may be provided with an internal liner such as illustrated at 26 in Fig. VIII. The portion of the strap overlying the edge of the lens may also be provided with such a liner if desired. In the latter instance, the bushing 49 could be formed of a rigid material as any existing strain would be taken up by the cushioning effect of the liner, it being understood that the liner is preferably formed of a pliable, yieldable resilient material. In instances, when a screw having a pointed end 52 is used the said end may be removed by cutting, filing or the like after the parts are in assembled relation with each other.

It is particularly pointed out that the body portion of the various bushings 12, 22, 30, 36 and 49 may be formed to a diameter substantially equal to that of the opening in the lens or as illustrated in Fig. XIII may be formed to a diameter less than the diameter in the opening in the lens. It being understood that the eccentricity of the bushing is such that a wall portion of sufficient thickness to take up any looseness and play which might exist between the lens strap and lens is provided.

In instances when it is desired to use a bushing other than one which is of a rigid, non-yielding material the material of said bushings preferably has a yielding resilient characteristic or may be formed of a pliable self-moldable material and may possess all or some of said characteristics.

In Figs. XIV and XV there is shown a further modification in which there is provided a bushing having a body portion 53 provided with an eccentric bore 54 and having an outwardly flared head 55 adjacent one end thereof. The outwardly flared portion 55 has its under surface cut away so as to provide an annular lens engaging edge 56. The outwardly flared portion 55 and body portion 53 are provided with a slot 57 extending inwardly to and communicating with the eccentric bore 54.

The purpose of the provision of an annular lens contacting edge 56 is to cause the engaging pressure of the outwardly flared portion 55 on the lens to be exerted at a location removed from the opening in the lens. This is to aid in relieving the pressure strain on the lens.

The purpose of the slots 57 is to allow the bushing to have an inherent resiliency for relieving strain on the lens when the eccentric portion thereof is rotated into engagement with the side wall in the opening in the lens to take up looseness and play of the lens strap on the lens.

The bushing 53 is mounted on a stud 58 attached within an opening in the strap ear 59 as by soldering, welding or the like, as illustrated at 60. In instances when it is desirable to have the stud 58 removable the said stud would be preferably secured to the strap ear 59 as by soft solder or the like which, if it should be desirable to remove the stud, the said ear and stud could be heated to soften the solder whereupon the stud could be forced outwardly of the opening in the strap ear. The stud 58 is provided with a threaded end 61 on which a nut or the like 62 is threaded to secure the parts in assembled relation with each other. The nut 62 may or may not be provided with a protrusion 63 having tapered side walls fitting within a recess of similar configuration formed in the bushing 53. The purpose of this protrusion is to increase the frictional surface contact of the nut with the bushing and to also provide a longer thread bearing connection of the nut with the threaded portion 61 of the stud.

In taking up the looseness and play of the lens strap on the lens the bushing 53 could be rotated in a manner similar to that set forth above. In this particular instance, the bushing could be formed of a material having an inherent resiliency or could be formed of plastic or resinous materials if desired. Due to the fact that the bushing is slotted, as illustrated at 57, the said bushing would have a constant resilient action in relieving the lens from excessive side pressure strain which might be introduced when the bushing is rotated to force the lens into intimate relation with the lens edge engaging portion 64 of the strap.

Although the stud 58 has been described as being preferably secured to the strap ear 59 by extending within the opening in the strap ear or by soldering or welding the stud to fit in the trap ear, it is to be understood that the said stud may be formed integral with the strap ear or may be formed with an irregular head as illustrated in Fig. III. It is to be understood that any of the bushings as have been illustrated at Figs. III, V, VI, VIII, X and so forth might be so formed as to have an annular contacting portion with the lens removed from the adjacent contour edge of the opening in the lens.

It is also to be understood that in instances when the bushing 53 is formed of a resinous, yieldable or moldable material it will shape itself to interlock with the inherent irregularities of the side wall of the opening in the lens in a manner similar to that illustrated in Fig. XIII.

A tapered protrusion 63 and an associated tapered recess or counterbore may be utilized with any of the constructions shown or described, if desired.

It is to be understood that although any of the bushings might be provided with a slotted wall, such as illustrated at 57, it is also to be understood that either one or both of the portions 59 and 64 overlies the respective side and edge surfaces of the lens and may be provided with a liner or resilient cushioning material, such as illustrated at 26.

Although applicant has shown and described threaded nut members for securing the parts in assembled relation with each other it is to be understood that any other mechanical equipment might be employed. It is also to be understood that resilient means in the form of a lock washer, compression springs or the like might be employed beneath the attaching nut of any of the constructions set forth, such as diagrammatically illustrated at 65 in Fig. XIV, or any known mechanical binding means may be used beneath the nut for locking the said nut against backing out and loosening during use. It has been found, however, that if the bushing 53 or the like is formed of plastic yieldable material the friction engagement of the nut with the said materials is sufficient to hold the nut against backing out and loosening.

From the foregoing it will be seen that we have provided simple, efficient and economical means for providing for repairs and replacements using thicker lenses, saving the expense of replacing the whole strap connections and insuring instant service for the patient and user in obtaining repairs in ophthalmic mountings of this character.

Having described our invention, we claim:

1. In a device of the character described, the combination of a lens having a connection opening therein with an irregular wall surface with irregularities in said opening, a lens holding member having a portion shaped to overlie the edge of the lens and a portion shaped to overlie a side portion of the lens and having another portion with lens pin attachment means thereon, an eccentric bushing of resilient material having a hardness less than the hardness of the irregularities in the lens connection opening, said bushing having an opening therein for locating said bushing on the lens pin internally of the opening in the lens, said bushing having a flange-like portion adjacent one end adapted to overlie a portion of the side surface of the lens opposite the lens holding side portion, said flange-like portion on the lens side thereof having an undercut surface forming an annular contact with the lens adjacent the contour edge of said connective opening, said bushing being adapted to be rotated on said pin to take up looseness and play between the lens holding means and the lens and simultaneously being adapted to have the material of the bushing forced into said irregularities of the lens connection opening forming a mechanical locking with the irregularities of the wall of the connection opening, and locking means on said pin secured to the attachment means for retaining the parts in assembled relation with each other and for locking the flange-like portion in contact with the lens to retain the bushing in adjusted position.

2. In a device of the character described, the combination of a lens having a connection opening therein with an irregular wall surface in said opening, a lens holding member having a portion shaped to overlie an end of the lens and a portion shaped to overlie a side portion of the lens and having another portion with lens pin attachment means thereon, a bushing of pliable material having an eccentric portion adapted to be placed on the pin internally of the opening in the lens, said bushing having a flange-like portion adjacent one end adapted to overlie a portion of the side surface of the lens opposite the lens holding side portion, said flange-like portion on the lens side thereof having an undercut surface forming an annular contact with the lens adjacent the contour edge of said connection opening, said bushing being adapted to be rotated on said pin to take up looseness and play between the lens holding means and the lens and simultaneously being adapted to have the material of the bushing forced into a mechanical locking with the irregularities of the wall of the connection opening, and nut means on said pin secured to the attachment means for retaining the parts in assembled relation with each other and for locking the flange-like portion in contact with the lens to retain the bushing in adjusted position.

LLOYD H. KIRK.
BROR J. JACOBSON.